United States Patent
Goldberg et al.

(10) Patent No.: US 6,762,855 B1
(45) Date of Patent: Jul. 13, 2004

(54) VARIABLE SPEED PRINTING SYSTEM

(75) Inventors: Stephen F. Goldberg, Dayton, OH (US); David E. Snoddy, Centerville, OH (US)

(73) Assignee: Eastman Kodak Company, Rochester, NY (US)

( * ) Notice: Subject to any disclaimer, the term of this patent is extended or adjusted under 35 U.S.C. 154(b) by 672 days.

(21) Appl. No.: 09/611,726

(22) Filed: Jul. 7, 2000

(51) Int. Cl.[7] .................. G06F 15/00; G06K 15/02
(52) U.S. Cl. .................. 358/1.5; 358/1.16; 358/1.17
(58) Field of Search .................. 358/1.17, 1.5, 358/1.16, 1.14, 1.3, 1.15, 1.8, 1.9, 404, 444, 486; 345/636

(56) References Cited

U.S. PATENT DOCUMENTS

| | | | | |
|---|---|---|---|---|
| 4,692,757 A | * | 9/1987 | Tsuhara et al. | 345/636 |
| 4,833,626 A | * | 5/1989 | Malcolm | 358/1.8 |
| 5,050,100 A | * | 9/1991 | Damon et al. | 358/1.16 |
| 5,077,680 A | * | 12/1991 | Sturm et al. | 358/1.5 |
| 5,129,049 A | * | 7/1992 | Cuzzo et al. | 358/1.14 |
| 5,138,561 A | * | 8/1992 | Crowe | 358/1.3 |
| 5,504,842 A | * | 4/1996 | Gentile | 358/1.15 |
| 5,524,186 A | * | 6/1996 | Campbell | 358/1.16 |
| 5,680,522 A | * | 10/1997 | Kasai | 358/1.14 |
| 5,729,665 A | * | 3/1998 | Gauthier | 358/1.18 |
| 5,781,707 A | * | 7/1998 | Kunz et al. | 358/1.5 |
| 5,913,018 A | * | 6/1999 | Sela | 358/1.17 |
| 6,100,998 A | * | 8/2000 | Nagao et al. | 358/1.9 |

* cited by examiner

Primary Examiner—Edward Coles
Assistant Examiner—Timothy J Stephany
(74) Attorney, Agent, or Firm—Barbara Joan Haushalter

(57) ABSTRACT

The present invention proposes a printing system whereby a supply of sufficient data is assured to the print engine so that the print engine can run continuously and efficiently. The printing system has at least one marking engine capable of printing an image on a media as a transport moves the media past the marking engine. Buffers or sets of buffers hold completely raster image processed pages and interface logic transfers the buffered pages to the marking engine to transfer the image to the media. Buffer management logic controls the buffers so that as the printing system accumulates slack time left over from raster image processing non-complex pages, the slack time is allocated to complex pages to optimize average raster image processing time with speed of the print engine.

19 Claims, 2 Drawing Sheets

VARIABLE SPEED PRINTING SYSTEM

TECHNICAL FIELD

The present invention relates to high speed variable data printing systems and, more particularly, to assuring the supply of sufficient data to the print engine of a high speed printing system so the engine can operate continuously and efficiently.

BACKGROUND ART

Ink jet printing systems are known in which a print head defines one or more rows of orifices which receive an electrically conductive recording fluid, such as for instance a water based ink, from a pressurized fluid supply manifold and eject the fluid in rows of parallel streams. Printers using such print heads and print engines accomplish graphic reproduction by selectively charging and deflecting the drops in each of the streams and depositing at least some of the drops on a print receiving medium, while others of the drops strike a drop catcher device.

The problem of supplying data at a rate sufficiently matched to the print engine is well-known in the industry. The processing speed that defines the sustained output speed of the controller is generally limited by the content of the data stream. For example, IPDS (Intelligent Printer Data Stream) and Postscript are both common languages used to drive printers in a data center environment and publishing environments. The time to rip (Raster Image Process) a page for both languages is highly data dependant and it is possible to define pages that take a substantial amount of time to prepare for output. Another limitation that affects the supply of data to the print engine may be the communication bandwidth, or the ability of the host to send data fast enough.

There have been many attempts to overcome this problem. One method is commonly used with cut-sheet printers. For example, some printers can stop feeding sheets while the current page is being ripped. Such a printing system then waits for the image to be completely ripped before moving forward. These printers simply withhold feeding a sheet of paper to the printing mechanism until the data for that page is ready for output. This holding back of a page is a common practice and can been seen in many office printers that render images using the Postscript™ page description language. Postscript is a very powerful page rendering language and the time to convert a page from its description into a bitmap is unpredictable.

The problem achieves new dimensions with continuous form printers, where it is difficult to withhold feeding of the paper. In these printers, such as the IBM Infoprint 4000 or the Oce Pagestream, the paper may be on a roll, i.e., continuously fed. The paper for an image may already be in the print engine when the print engine runs out of data. In this case, the printer abruptly stops the paper motion and waits for the data. This is known as "clutching." In some cases, the printer needs to reverse-feed to reposition the paper for proper image placement. Clutching is undesirable for several reasons. It places undo wear and tear on the printer mechanism. Furthermore, clutching slows down the overall throughput. Also, clutching may affect image quality in printers that have multiple print stations such as printers that image black and colors in series. Therefore, it is not practical to stop printing in the middle of one of the pages, due to the inevitable print defects that will occur.

Another approach to dealing with this situation is described in U.S. Pat. No. 5,729,665, issued to Gauthier. The '0 665 patent teaches a method of separating the fixed from the variable portions of each page such that the printer needs only replace the variable elements. This allows the RIP to convert fixed data into bitmaps only once, and fill in the variable data as needed. The '665 patent is one of many methods used to minimize the processing of variable information to speed up the image development process. While this approach reduces the number of times a printing system will be starved for data, it does not eliminate the problem. The major drawback of this approach is obvious. If all or a majority of the data for every page is variable, the concept of repeating the fixed data and only processing the variable data falls apart.

Ultra high speed printers such as the Scitex Digital Printing 3600, which prints at speeds over 4000 pages per minute, present yet another challenge. Ultra high speed printers such as the Scitex Digital Printing 3600 printer feed paper from a large roll, typically weighing hundreds of pounds. It is impractical to "clutch" the paper to stop and start it in a short period of time. Even if it were possible to do so, it would bring the average print time down so far that the financial benefits of using such an ultra high speed printer would be minimized. Restricting the content of pages is also unacceptable since even a single page that is not ready for printing could cause the printer to have to immediately halt.

A method of dealing with this problem that is currently employed is to restrict the data input such that the data rendering process can guarantee that pages can be converted into bitmaps at the full rated speed of the printing system. The Scitex Digital Printing IJPDS (Ink-Jet Printer Data Stream) language requires pre-processing of images during data preparation where all time consuming ripping is done off-line. The RIP (raster image processor) in the printer pre-loads all of the complicated bitmaps and fonts at the start of a print job and simply assembles them into the proper locations during the real-time print cycle. The pre-ripped images may be used once or multiple times without restriction. The Scitex RIPs using IJPDS are scalar and powerful enough to guarantee real time printing without stopping in all practical cases. The disadvantage of this approach is a limitation on the type of imaging that can be done at the last minute on the printer.

It is seen then that it would be desirable to be able to optimize printer efficiency by matching the supply of data to the print engine so that the print engine can be prevented from stopping unnecessarily or "clutching". It would further be desirable to provide a RIP in an existing ultra high speed printer other than an IJPDS RIP. In order to enter certain markets, it is required to utilize a RIP that interprets IPDS (Intelligent Printer Data Stream), which is quite different from IJPDS language.

SUMMARY OF THE INVENTION

The present invention proposes a system that overcomes one of the most difficult issues facing high speed printing systems, that is, assuring the supply of sufficient data to the print engine so the engine can continue to run efficiently without stopping. The present invention applies the fact that for any given document it is reasonable to assume that there may be very complex pages and very simple pages. The input bandwidth of the host interface is capable of providing data at the full rated speed, but the host computer may from time to time not be able to put enough data into the pipeline to keep the printer running. Recognizing that in some cases, the data supply exceeds the capacity of the print engine and in other cases the capacity of the print engine exceeds the data supply, the present invention optimizes the efficiency of the print engine. This capacity mismatch may be due to ripping complexity (the process of taking the page description language and converting it into a bitmap), or simply the supply bandwidth between the source, typically a host computer, and the RIP.

In accordance with one aspect of the present invention, a printing system supplies sufficient data to the print engine so that the print engine can run continuously and efficiently. The printing system has at least one marking engine capable of printing an image on a media as a transport moves the media past the marking engine. Buffers or sets of buffers hold raster image processed pages, and interface logic transfers the buffered pages to the marking engine to transfer the image to the media. Buffer management logic controls the buffers so that as the printing system accumulates slack time left over from raster image processing non-complex pages, the slack time is allocated to complex pages to optimize average raster image processing time with speed of the print engine.

It is the object of this invention to accommodate situations where on average, the complexity of pages and the system bandwidth are capable, but real world conditions assume that during the printing process this capacity may be overtaxed such that the overall print speed is maintained at the highest optimum level while providing sufficient data such that the print engine can continue to operate smoothly. Other objects and advantages of the invention will be apparent from the following description, the accompanying drawings and the appended claims.

DETAILED DESCRIPTION OF THE PREFERRED EMBODIMENTS

Figure 1:
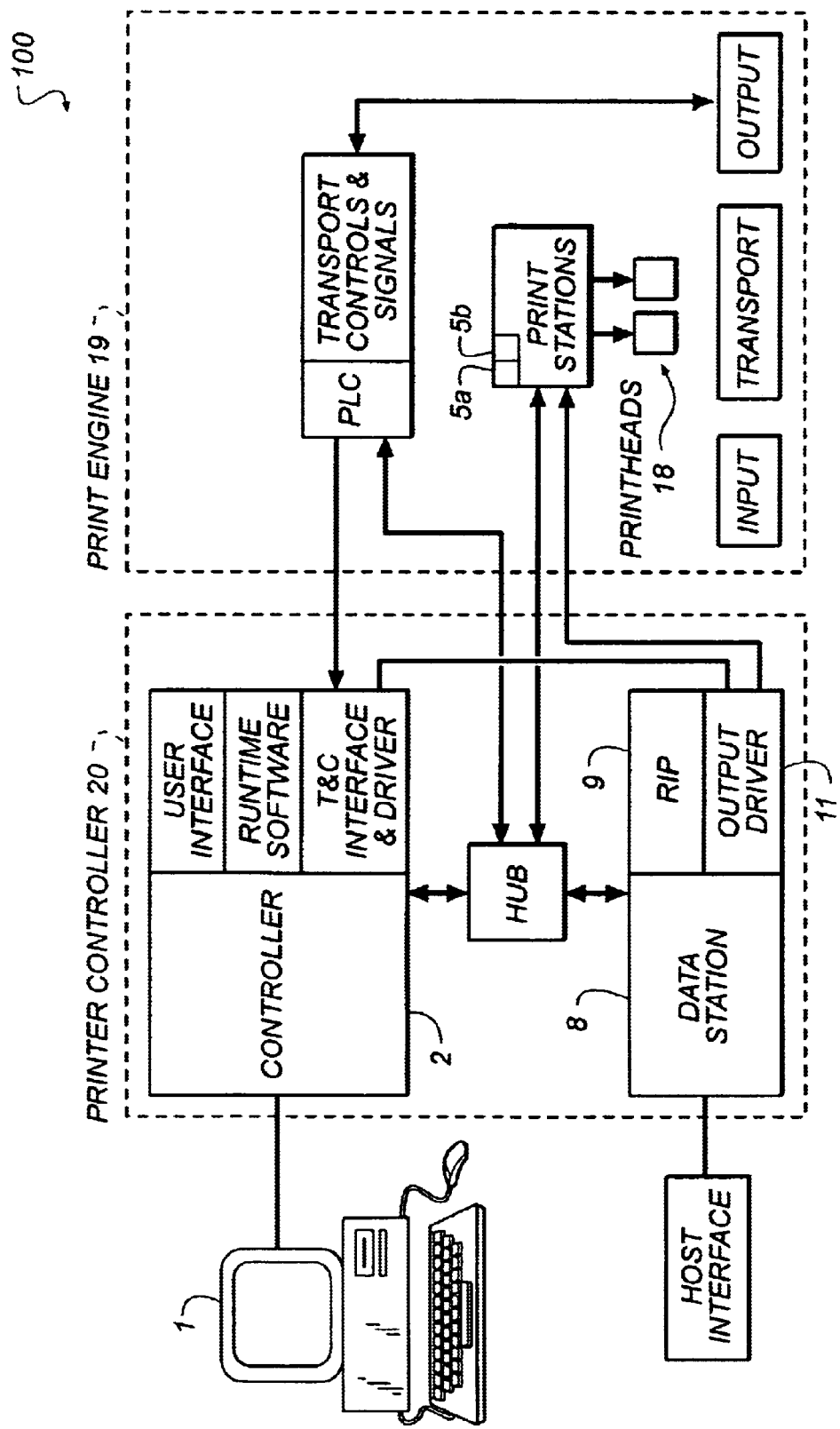
FIG. 1 is schematic block diagram of a typical prior art printing system.

A typical prior art printing system 100 is illustrated in FIG. 1. Data is supplied from a host computer 1, converted into bitmaps in a Raster Image Processor (RIP) 9, and then fed to a print engine 19 where the bitmaps are converted into printed images. The means for applying the image to paper or other media may be via toners, inks or any other printing means and is well understood. It is noted that the present invention is not limited to any specific image transfer process.

All printers contain some type of controller 2 that monitors and controls the electromechanical aspects of the printer, coordinates the laying of the printed image on the page with the feeding and/or movement of paper itself. The controller may be included within the printer, as is the case with simple desktop printers; or external to the print engine, as is the case for higher speed industrial printers such as the Scitex VersaMark™, the IBM Infoprint™, the Oce Pagestream™, and other such printers. It may be a single subsystem, or the functions of the controller may be several sub-systems physically or logically dispersed within the printer system. In either case, the set of logical and physical functions that perform the controller tasks are referred to as the controller, indicated by reference number 20 in FIG. 1. The printer controller 20 may have a user interface 3 by which the configuration of the printer or the flow of the data can be set up and/or monitored. Runtime software 4 controls the flow of data from a data source via a host interface 7.

All of these printers contain a data station 8 that typically contains the RIP 9 that converts information generally in the form of a page description language into bits that represent the final image. In some cases, the data station may receive pre-ripped bitmaps and simply convert them into the final form ready for output to the media. The printers also contain some type of output driver 11 that is capable of driving the marking engine which may be one or more printhead(s) 18, a laser beam, LEDs, etc. Some of the controllers have input signals, or cue sensors 5a, that are sense marks on the paper to indicate the start of an imaging area on the paper. The interface in some printers also tracks the distance the paper travels using tach encoder 5b. Electronic circuits may be used to sense these signals in a tach and cue interface hardware and software driver 5. The printer controller 20 and the data station 8 may be contained within a single computer, or in separate computers connected via some communication device such as hub 6.

Figure 2:
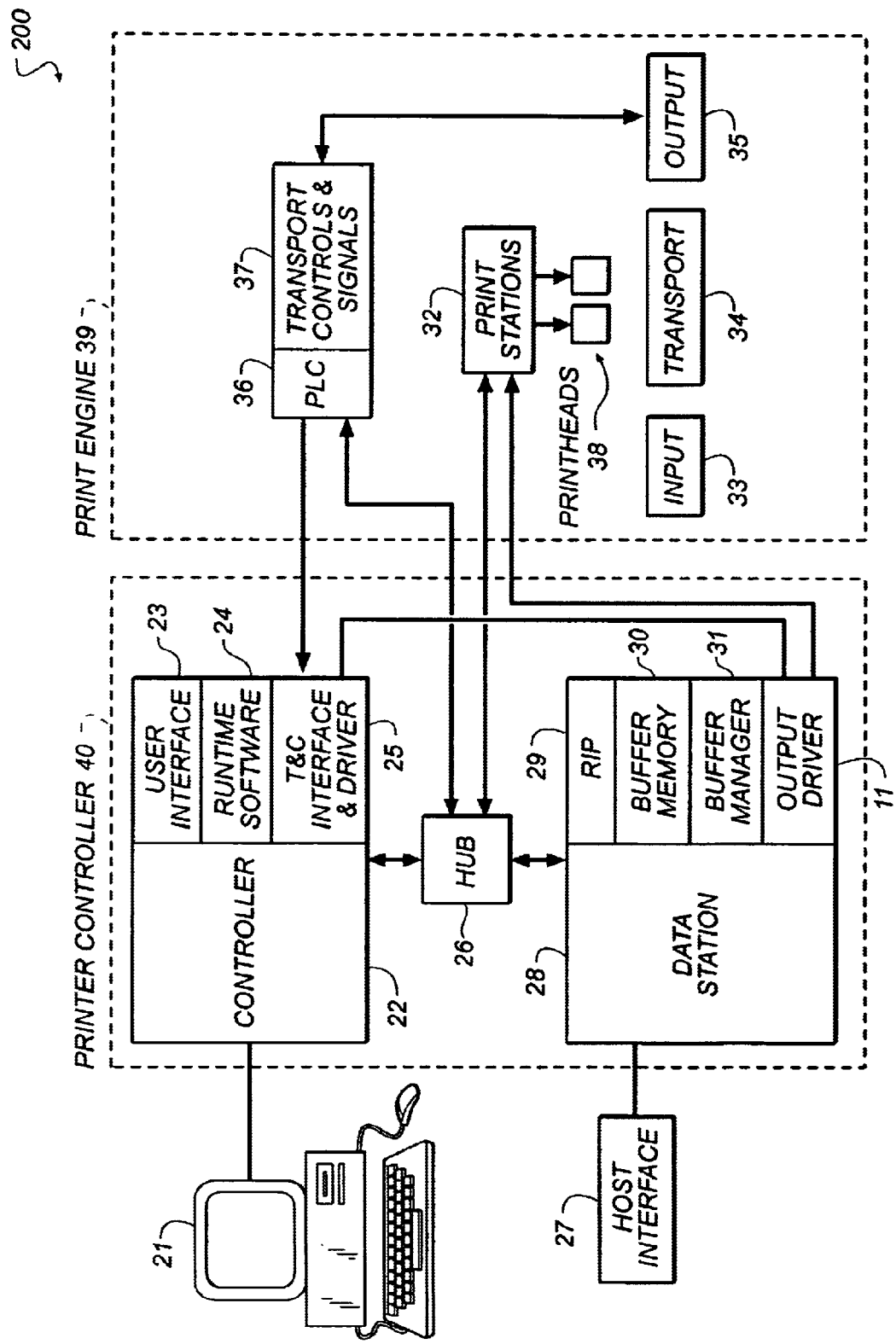
FIG. 2 is a schematic block diagram of the printing system for assuring the supply of sufficient data to the print engine so that the engine operate efficiently and continuously, in accordance with the present invention.

Although the present invention is hereinafter described with reference to a Scitex Digital Printing print engine and Printer Controller, it will be understood by those skilled in the art that the concept of the invention can be applied to multitude other systems without departing from the scope of the invention. Referring now to FIG. 2, a printing system 200 is illustrated, embodying the present invention. The printing system 200 of FIG. 2 is designed to connect to a host computer 21, capable of connecting to an IPDS data stream. This is a bi-directional interface where the printing system is in communication with the host, both receiving print instructions and providing status information.

The present invention describes a system that takes advantage of the fact for any given document it is reasonable to assume that there is a combination of very complex pages and very simple pages. While the input bandwidth of the host interface is capable of providing data at the full rated speed, the host computer may from time to time not be able to put enough data into the pipeline to keep the printer running.

To overcome this problem, the present invention proposes adding a very large image buffer memory 30 and a buffer manager 31, as illustrated in FIG. 2, to the typical printer architecture such as is illustrated in FIG. 1. The use of memory buffers is known, and existing printers typically buffer a small number of pages to help smooth the interaction between the printer mechanism and the data stream. However, the present invention combines the use of a very large buffer, hundreds of pages long with an intelligent control system to achieve the desired result of supplying sufficient data to the print engine 39 to keep the print engine running continuously and efficiently.

The print engine 39 includes one or more print stations 32, each managing the ink jet for one or two printheads 38. The printing system 200 contains a transport 34, a transport controller 37 controlled by a Programmable Logic Controller 36, a paper input source 33, and a paper output collector 35. It should be noted that the paper output may be a roll, or any other suitable post print peripheral such as a folder, cutter etc., or it may feed a production line for more complete finishing. It will be obvious to anyone skilled in the art of high-speed printers that this invention is not limited to ink-jet printing, but can be applied to any high speed printing system including page-fed systems. The print engine in this specific example is capable of printing a single color A4 page up through two full across, duplex A4 pages in full cyan, magenta, yellow and black process color.

In accordance with the present invention, the system controller 22, of printer controller 40, uses information from the buffer manager 31 to control the speed of the transport 34, such that the speed of consuming image buffers is matched to the speed of rendering the buffers to the media. The system incorporates an intelligent "look ahead" feature to optimize overall throughput.

The printer controller 40 communicates with user interface 21, and includes a system controller 22 which has the user interface software 23, the runtime software 24, tach and cue interface hardware and software 25, a communication hub 26, an input source 27, a data station 28 containing one or more RIPS 29, a set of buffers 30 where ready-to-print images are stored, and a buffer manager 31. The input source 27 may be a host interface, a file on a network, may be on a local disk, or any other suitable means for inputting data.

The user interface 21 provides setup and status information for the operation of the system 200. Via this interface, the user may describe to the controller the physical characteristics of the printer, such as the relationships of the printheads, desired color(s) the system is capable of printing, and other information. Upon a power-up or a reset, the printer controller 40 initializes the system to a ready state. In this embodiment, the data station 28 is connected to the host computer 27 via one or more physical and logical interfaces, to receive command and data instructions, process system level commands, and provide those commands to the system controller 22.

Commands and data that pertain to creating images are sent to the RIP 29. The RIP converts the command and data into "pages" ready for output to the print engine. In the case of a conventional printing system, the page would indeed go immediately to the print engine, perhaps buffered by a small number of page buffers to assist in synchronizing the buffers to the media.

In an attempt to maintain maximum throughput, the buffer manager 31 of the printer controller 40 attempts to average the processing time for a page over a very large number of pages, so a single complex image or page does not slow the system down. In the preferred embodiment, the controller reads the size of the buffer pool from the buffer manager and attempts to build up a queue of several pages before starting the transport in motion. It allows the image buffer pool to grow to approximately two hundred feet of printed area by keeping the print speed rate slightly slower than the rate at which pages are added to the buffer pool as it ramps the web up to its maximum speed. It stores these completed images in buffer memory 30 that is managed by buffer manager 31. In a preferred embodiment of the present invention, the size of the buffer pool is 3 gigabytes of RAM. Anyone skilled in the art of computers will realize that it is also possible to store the buffers by multiple other means, such as in a high-speed mass storage.

Once several pages are available, the printer controller 40 instructs the transport controller PLC 36 to begin to ramp the paper transport 34 to the minimum print speed. The printer controller continually inspects the backlog of pages in the buffer memory. If the backlog of pages grows, the printer controller instructs the transport PLC to increase the web speed. If the backlog of completed pages still continues to grow, the PLC is instructed to continue to increase speed until the maximum web speed is reached. However, if the backlog of completed pages decreases, the controller assumes that the amount of processing is such that the printer cannot maintain the current web speed. In this case, it will ramp the transport down to maintain the queue at a steady point. The transport must change the print speed in a controlled manner, while printing, such that it does not cause print defects.

The present invention can be implemented on an ink jet printing system. With ink jet printing, it takes a given amount of time for a drop of ink to fall from the printhead to the paper. Since the time for the ink to fall is constant, but the transport motion speed is variable, the drop release time has to change to maintain constant position of a dot on the paper. The controller provides "flight time" compensation that attempts to maintain the position of printed data as the web speed changes.

For the buffer management system of the present invention to operate optimally, it is necessary to rapidly adjust the speed of the transport to the new speed requested by the controller. However, the speed increase cannot be so rapid as to cause any print or stitching defects or registration defects caused by flight time errors, such as are described above. The buffer manager in the preferred embodiment takes this into consideration and communicates not only speed targets, but also data so the PLC can determine the maximum allowable acceleration.

The controller adjusts the flight time on a per-document basis. Due to the physical characteristics of a high speed printer, the maximum rate of change for this implementation is preferably no greater than 4.16 fpm per document. This will hold registration errors due to speed compensation adjustments to approximately one tach pulse of 1200 ppi. The speed must be adjustable with the above constraint in the range of 500 fpm to 25 fpm, the lowest print speed supported. In a general implementation, these characteristics may be different for different print technologies, without altering the concept of the present invention.

In a preferred embodiment of the present invention, the buffer manager 31 contains additional logic to assure that the print engine is run smoothly. Theoretically, the print speed could be constantly changing, faster and slower, if the data input is erratic. However, this is not a desirable situation. To prevent this, the buffer manager 31 incorporates logic that looks at changes in the buffer capacity, insures that the changes are a "trend", and then takes appropriate action. The speed change ramp of the transport is not instantaneous and takes some time. If the buffer manager determines during the time the speed change starts and before it ends, that the buffer situation has changed, the buffer manager can issue a new speed target and ramp. The transport controller has the capability to adapt to the new target at any time.

The present invention has several benefits over the current art commonly practiced. One, the very large buffer memory allows the printer controller to average the processing speed over hundreds of pages. For example, if "on the average" a job is capable of running at a very high speed, but a couple of pages contain images that are very complex to rip, the current invention allows the RIP to accumulate all slack time for the easy pages and spend that extra time on the very complex pages. Also, the management of variable speed of the transport coupled with the look ahead logic of the buffer manager gives the total system time to react in a controlled manner to those specific conditions where the average speed cannot be maintained over the several hundred page buffer. Slowing the system down eliminates the need for clutching the paper path and the undesirable effects of clutching.

The invention has been described in detail with particular reference to certain preferred embodiments thereof, but it will be understood that modifications and variations can be effected within the spirit and scope of the invention.

What is claimed is:

1. A printing system having a print engine, the printing system comprising:
   at least one marking engine capable of printing an image on a media;
   a transport means for moving the media past the at least one marking engine;
   buffer means for holding completely raster image processed pages as buffered pages;
   interface logic for transferring the buffered pages to the at least one marking engine to transfer an image to the media; and
   buffer management logic for controlling the buffer means whereby as the printing system accumulates slack time left over from raster image processing non-complex pages, the slack time is allocated to complex pages to optimize average raster image processing time with speed of the print engine.

2. A printing system as claimed in claim 1 wherein speed of the transport is variable.

3. A printing system as claimed in claim 2 wherein the buffer management logic comprises means for counting buffered pages.

4. A printing system as claimed in claim 3 wherein the buffer management logic controls the speed of the transport based on the number of buffered pages.

5. A printing system as claimed in claim 3 wherein the buffer management logic controls the speed of the transport to maximize the speed of the transport without depleting the number of buffered pages.

6. A printing system as claimed in claim 1 wherein the buffer means comprises a single buffer.

7. A printing system as claimed in claim 1 wherein the buffer means comprises one set of buffers.

8. A printing system as claimed in claim 1 wherein the buffer means comprises a plurality of sets of buffers associated to accommodate two across printing and duplex printing.

9. A printing system as claimed in claim 1 wherein the buffer means comprises at least one set of page buffers associated with a specific location on the media to accommodate multi-color printing.

10. A printing system as claimed in claim 1 further comprising storage means for storing the raster image processed pages.

11. A printing system as claimed in claim 10 wherein the storage means comprises means for storing the raster image processed pages in a compressed form, creating compressed data, to increase capacity of page storage.

12. A printing system as claimed in claim 11 further comprising means for uncompressing the compressed data as the compressed data is moved from the buffer means to the print engine.

13. A high speed variable data printing system having a controller for monitoring and controlling electromechanical features of the printing system and further having a print engine, with a sustained output speed of the controller being defined by processing speed of the printing system, the printing system comprising:
   raster image processing means for preparing fixed and variable data images as raster image processed pages to be printed;
   at least one marking engine capable of printing the fixed and variable data images on a media;
   a transport means for moving the media past the at least one marking engine;
   buffer means for holding the raster image processed pages as buffered pages;
   interface logic for transferring the buffered pages to the at least one marking engine to transfer an image to the media; and
   buffer management logic for controlling the buffer means whereby as the printing system accumulates slack time left over from raster image processing non-complex pages, the slack time is allocated to complex pages to optimize average raster image processing time with speed of the print engine.

14. A printing system as claimed in claim 13 wherein the buffer management logic controls a variable speed of the transport based on number of buffered pages.

15. A printing system as claimed in claim 14 wherein the buffer management logic controls the speed of the transport to maximize the speed of the transport without depleting the number of buffered pages.

16. A printing system as claimed in claim 13 wherein the buffer means comprises a single buffer.

17. A printing system as claimed in claim 13 wherein the buffer means comprises one set of buffers.

18. A printing system as claimed in claim 13 wherein the buffer means comprises a plurality of sets of buffers associated to accommodate two across printing and duplex printing.

19. A printing system as claimed in claim 13 wherein the buffer means comprises at least one set of page buffers associated with a specific location on the media to accommodate multi-color printing.

* * * * *